(12) United States Patent
Stoiber et al.

(10) Patent No.: US 8,408,893 B2
(45) Date of Patent: Apr. 2, 2013

(54) RAPID CHANGEOVER MECHANISM FOR BOTTOM PORTIONS

(75) Inventors: Christian Stoiber, Michelsneukirchen (DE); Thomas Philipp, Sinzing-Eilsbrunn (DE); Harald Effenberger, Schierling (DE)

(73) Assignee: Krones AG, Neutraubling (DE)

( * ) Notice: Subject to any disclaimer, the term of this patent is extended or adjusted under 35 U.S.C. 154(b) by 280 days.

(21) Appl. No.: 12/846,244

(22) Filed: Jul. 29, 2010

(65) Prior Publication Data

US 2011/0027409 A1 Feb. 3, 2011

(30) Foreign Application Priority Data

Jul. 31, 2009 (DE) .................. 10 2009 035 871 U (51) Int. Cl.
*B29C 49/48* (2006.01)
*B29C 49/56* (2006.01)
(52) U.S. Cl. .................. 425/182; 425/522; 425/541
(58) Field of Classification Search .................. 425/182, 425/522, 541
See application file for complete search history.

(56) References Cited

U.S. PATENT DOCUMENTS

| 5,750,161 A | 5/1998 | Schock, Jr. et al. |
| 5,884,450 A | 3/1999 | Ronchi |
| 7,037,099 B2 | 5/2006 | Linke et al. |
| 8,057,210 B2 * | 11/2011 | Clark ............................ 425/182 |
| 2004/0052892 A1 | 3/2004 | Linke et al. |
| 2010/0278961 A1 * | 11/2010 | Clark ............................ 425/541 |
| 2012/0091631 A1 * | 4/2012 | Blochmann et al. .......... 264/402 |

FOREIGN PATENT DOCUMENTS

| DE | 10 2008 004 773 A1 | 7/2009 |
| EP | 1 299 223 B1 | 4/2003 |

* cited by examiner

*Primary Examiner* — Robert B Davis
(74) *Attorney, Agent, or Firm* — Novak Druce Connolly Bove + Quigg LLP (57) ABSTRACT

An apparatus for molding plastic preforms into plastic containers may include at least one blow molding station having a cavity. Within the cavity, the plastic preforms may be expanded into plastic containers. The blowing station has a bottom portion which delimits the cavity. The bottom portion is detachably disposed on a carrier by a fastening mechanism. The fastening mechanism has at least one pin-like body disposed on a first fastening element. The pin-like body engages in a condition in which the bottom portion is fastened to the carrier in a groove which is provided in a second fastening element. The pin-like body is displaceable relative to the carrier in the groove for fastening the bottom portion, and the groove is designed in such a way that an end section of the pin-like body may pass through the groove in a first section of the groove and cannot pass through the groove in a second section of the groove.

15 Claims, 7 Drawing Sheets

RAPID CHANGEOVER MECHANISM FOR BOTTOM PORTIONS

CROSS-REFERENCE TO RELATED APPLICATION

This application claims the benefit of priority of German Patent Application No. 10 2009 035 871.4, filed Jul. 31, 2009, pursuant to 35 U.S.C. 119(a)-(d), the disclosure of which is incorporated herein by reference in its entirety as if fully set forth herein.

TECHNICAL FIELD

The present disclosure relates generally to an apparatus for moulding plastic preforms into plastic containers and, more particularly, to a rapid changeover mechanism for bottom portions.

BACKGROUND

Apparatuses for moulding plastic preforms into plastic containers have been known from the prior art for a long time and usually include a plurality of blow-moulding stations arranged on a carrier wheel, and which are used for moulding plastic preforms into plastic containers by means of blow moulding.

Here, blow moulding stations of this kind usually have two mould parts which, together with a bottom portion, delimit a cavity within which the plastic preforms are expanded. In order to change the tooling it is necessary to replace the bottom portions. In the prior art, the bottom portions are usually screwed onto a carrier, and in the case of a tooling change will have to be dismantled in a relatively complex procedure. Further, however, it is necessary for the bottom portions to be arranged in a stable manner relative to their respective carriers.

From EP 1 299 223 B1 an apparatus for blow moulding containers is known. Here, a bottom insert is provided which is connected to a positioning unit. In order to achieve a connection a coupling profile is used here which is formed from a coupling element connected to a base plate as well as a counter element connected to the bottom element and which can be actuated by means of a manual lever, in order to achieve a corresponding separation of the bottom insert.

U.S. Pat. No. 5,750,161 describes a rapid changeover mechanism for a blow moulding device. Here, a first and a second closure element are provided, wherein the second closure element is movably disposed between a position closed with the first closure element and a release position.

It may therefore be desirable to provide a rapid changeover mechanism for bottom portions, which at the same time has a high degree of stability in a secured condition.

SUMMARY OF INVENTION

An apparatus according to the disclosure for moulding plastic preforms into plastic containers includes at least one blow moulding station which includes or forms—in particular in a closed condition—a cavity, within which the plastic preforms may be expanded into plastic containers. Here, the blow moulding station includes a bottom portion delimiting the cavity, wherein the bottom portion is detachably fastened to a carrier by means of a fastening mechanism.

According to the disclosure, the fastening mechanism has at least one pin-like body provided on a first fastening element, which engages, in a fastened condition of the bottom portion, on a carrier in a groove provided in a second fastening element, wherein the pin-like body may be displaced for fastening the bottom portion relative to the carrier in the groove or opposite the groove, and the groove is designed in such a way that a terminal section of the pin-like body may pass through the groove in a first area of the groove and cannot pass the groove in a second area of the groove.

Thus, a fastening mechanism is suggested wherein the two fastening elements are moved against each other, for example twisted against each other, between a closed and a released condition. By means of this twisting, the pin-like body opposite the groove and thus opposite the second fastening element is arrested. By means of this arresting, a closure of the bottom portion on its carrier is developed. In some aspects, the pin-like body is provided to be stationary or only in a certain direction movable relative to the bottom portion. In particular the pin-like body is disposed, in the direction of a rotational movement of the bottom portion relative to the carrier, to be stationary relative to the bottom portion.

In some embodiments, the pin-like body has at least one recess on its outer circumference. This means that the pin-like body has a smaller cross section in the area of this recess. In some aspects, this recess is formed to be continuous.

According to various embodiments, this recess is designed with respect to its cross section in such a way that it may be displaced completely within the above-mentioned groove provided on a second fastening element. Thus, this recess engages in the groove or in the edges of the groove and the pin-like body can in this way essentially no longer be moved relative to the groove in a second area of the groove in its longitudinal direction.

In some embodiments, the bottom portion is provided on an adapter element and the adapter element is mounted on the carrier via the fastening mechanism. By means of this adapter element, different height movements of the bottom portions relative to the blow moulding station or relative to the lateral portions may be compensated.

In some embodiments, the at least one pin-like body is in connection with the bottom portion. Here it is possible that the pin-like body is mounted immediately on the bottom portion, but it would also be possible for the pin-like body to be disposed on the above-mentioned adapter element and this adapter element in turn on the bottom portion. In this way, too, the pin-like body is in (immediate) connection with the bottom portion.

In various embodiments, the fastening element is mounted rotationally relative to the bottom portion. It is possible here that for detaching the bottom portion the fastening element is rotated about a specified rotational axis, but it would also be possible for the bottom portion itself to be rotated, in order to achieve this solution.

In some embodiments, an inclined guide surface is provided in at least one groove, which in the case of a relative movement of the pin-like body relative to the groove in the direction of the groove causes the pin-like body to be moved in its longitudinal direction. In this way it is possible, in particular in connection with the above-mentioned spring element, that during a rotation for example the first fastening element, the pin-like body is pushed against the load of the spring and in this way the bottom portion is clamped to the carrier.

In various embodiments, a latching surface is provided in at least one groove, in which a section of the pin-like body latches in a predefined relative position between the groove and the pin-like body. This relative position preferably is a completely mounted condition, so that latching will take place in this condition. This latching surface may be for example a horizontally extending surface, but it would also be possible for the latching surface to be formed as a (minor) recess into which a section of the pin-like body latches (for example the end section). A corresponding latching mechanism could also be achieved by providing balls in running surfaces or the like.

In some embodiments, the first fastening element is provided to be rotational about a predefined rotational axis. In this case the above-mentioned grooves extend at least partially and preferably completely in the circumferential direction of the fastening element. In this way, the bottom portion may be detached by rotating the fastening element. According to various aspects, a lever may be provided on the fastening element, by means of which the user may achieve a twisting action of the first fastening element.

In some embodiments, a support body is disposed in a mounted condition of the bottom portion between the first fastening element and the second fastening element. Thus, it is possible for the support body itself to be provided in a stationary manner and for the bottom portion to be placed on top of this support body. The bottom portion may be arrested relative to the support by twisting the second fastening element, without itself having to be twisted in the process of this. In some aspects, the pin-like body/bodies will extend through the support body. This support body is preferably used for centring the bottom portion.

In various embodiments, the apparatus has at least two pin-like bodies spaced apart from one another. Correspondingly, preferably also at least two grooves are provided into which the two pin-like bodies extend. In this way, a particularly stable arrest of the bottom portion will be made possible.

According to various aspects, the two pin-like bodies are arranged opposite one another with respect to a rotational axis of the second fastening element. The grooves, too, may be arranged point symmetrically relative to a rotational axis.

In some embodiments, passages for guiding a flowable medium are provided within the first fastening element. This flowable medium may in particular be a cooling liquid for cooling the bottom portion. Corresponding cooling channels may be provided also in the bottom portion itself.

Providing these channels for guiding a flowable medium also facilitates a rapid mounting of the bottom portion, since in this way not only the bottom portion itself may be mounted quickly, but at the same time also the necessary cooling liquid connections may be established or closed.

According to various aspects, therefore, liquid connections are provided on the first fastening element, which extend in a longitudinal direction of the pin-like body. In this way, during placing of the bottom portion on the second fastening element also the liquid connections may be pushed into corresponding couplings, so that in one operation also the cooling liquid connections will be established.

In some embodiments, the apparatus has a supply connection for supplying a flowable tempering medium and a discharge connection for discharging the flowable tempering medium as well as a supply element, in order to supply the flowable medium to the supply connection, and a discharge element in order to discharge the tempering medium from the discharge connection. Here, at least the supply element may be automatically disconnected from the supply connection or the discharge element may be automatically disconnected from the discharge connection. In this embodiment it is suggested that, for an exchange of the blow moulds or the bottom moulds, also the media connections are at least automatically released.

Preferably, the tempering medium is used for tempering the bottom mould or the bottom portion, so that also passages for guiding the tempering medium extend in the bottom mould and/or the bottom portion.

However, it is to be noted that this embodiment may also be used independently from the subject matter of the invention described here.

The present disclosure is also directed to an apparatus for moulding plastic preforms into plastic containers having at least one blow moulding station which includes a cavity. The plastic performs within the cavity may be expanded into the plastic containers, wherein the blow moulding station includes a bottom portion which delimits the cavity, and wherein the bottom portion is detachably disposed on a support by means of a fastening mechanism. In this embodiment according to the disclosure, additionally here the above-mentioned supply and discharge connections as well as the supply elements and discharge elements for the flowable tempering medium are provided and at least the supply element or the discharge element may be automatically separated from the supply connection or the discharge connection.

In the prior art, in the case of a change of the blow moulds by means of mould changing stations, the bottom moulds and the media connections have to be manually released and subsequently locked again. This releasing and locking of the mould bottoms has to be carried out manually and therefore costs time. Preferably, by means of an integrated unit in the mould changer and on the blow moulding stations, this releasing and locking and the connection and disconnection of the media connections on the bottom mould may be automated and in this way time for the changing operation may be saved. The above-mentioned tempering media are used for tempering the bottom mould, for example to apply a desired temperature to the internal wall of the bottom mould. Thus, it is in particular possible to cool the bottom mould.

It is preferably possible to separate both the supply element from the supply connection and the discharge element from the discharge connection in an automated manner. The term automated is supposed to be understood here to mean that the separation and preferably also the connection of the respective connections are carried out at least partially without any manual intervention. In some aspects, the separation and/or the connection is/are carried out during or by means of a movement of the individual blow moulding stations and particularly preferably during a special mounting operation of the system.

In some embodiments, the supply element and the discharge element are arranged on a common (if necessary movable) support. By means of a movement of this common support, the media connections may be separated or connected. Valve means may be provided which prevent, for example if the supply element is separated from the supply connection and/or the discharge element is separated from the discharge connection, the escape of liquid from the bottom portion.

According to various aspects, the apparatus has a guiding curve for separating the supply element from the supply connection and/or for separating the discharge element from the discharge connection. Thus it is possible that, whilst inserting the blow moulding stations into a mould changer by means of a curve, for example a pusher equipped with a roller, releases the bottom mould. Subsequently, by means of a further curve and a further unit having a roller, which is advantageously integrated into the blow moulding station, the media connections of the mould bottom may be automatically decoupled. After this operation, the bottom mould may be exchanged.

Locking and coupling the bottom mould (or the media connections thereof) are advantageously carried out automatically during withdrawal of the mould exchanger via two further curves. In this way it is possible to eliminate any operating errors by personnel, for example an incorrect locking or coupling.

In some aspects, the apparatus has at least one guiding curve in order to lock or unlock the first fastening element or the bottom mould (in particular relative to other components of the blow mould and/or a carrier). According to various aspects, a guiding curve for locking the bottom mould is provided, and a further guiding curve is provided for unlocking, particularly preferably both guiding curves may be fed in. However, it would also be possible for the locking and unlocking to be carried out via other mechanisms such as for example electrical, pneumatic and/or hydraulic drives.

It is to be noted that the coupling and decoupling of these media connections as described here may also be retrofitted into existing systems.

The present disclosure is further directed to a mounting assembly for arranging a bottom portion for an apparatus for moulding plastic preforms into plastic containers. Here, the bottom portion is arranged on a support to be detachable by means of a fastening mechanism.

According to various aspects, the fastening mechanism has at least one pin-like body provided on a first fastening element, which pin-like body engages, in a fastened condition of the body portion on a support, in a groove provided in a second fastening element, wherein the pin-like body is slidable in the groove for fastening the bottom portion relative to the support, and the groove is arranged in such a way that a terminal section of the pin-like body may pass through the groove in a first area of the groove, and the groove cannot pass in a second area of the groove. The rapid release mechanism described here may also subsequently be retrofitted to existing systems.

Some further advantages and embodiments may become evident from the attached drawings.

DETAILED DESCRIPTION

Figure 1:
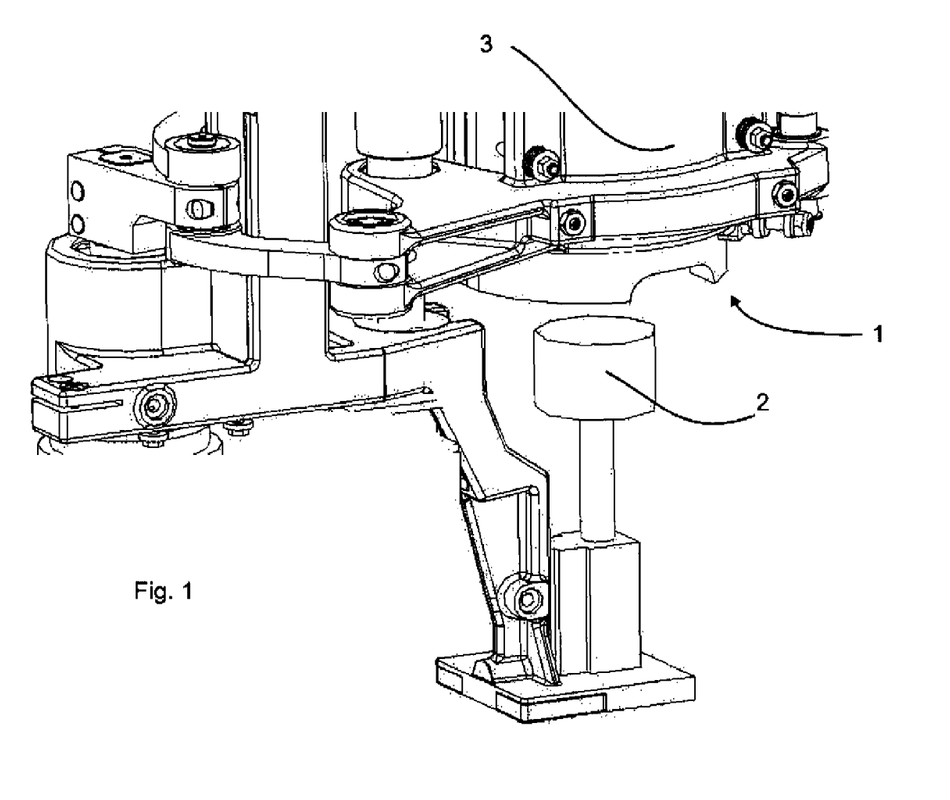
FIG. 1 shows a perspective partial view of a blow moulding station of an apparatus according to the disclosure.

FIG. 1. shows a partial view of a blow moulding station 1 according to the disclosure. This blow moulding station 1 has here lateral portions 3 (only partially shown), which together with a bottom portion 2 (schematically shown) delimit a cavity (not shown). Reference numeral 1 identifies here the blow moulding station in its entirety. An apparatus according to the disclosure can here include a plurality of blow moulding stations, which may be arranged for example on a common carrier wheel.

Figure 2:
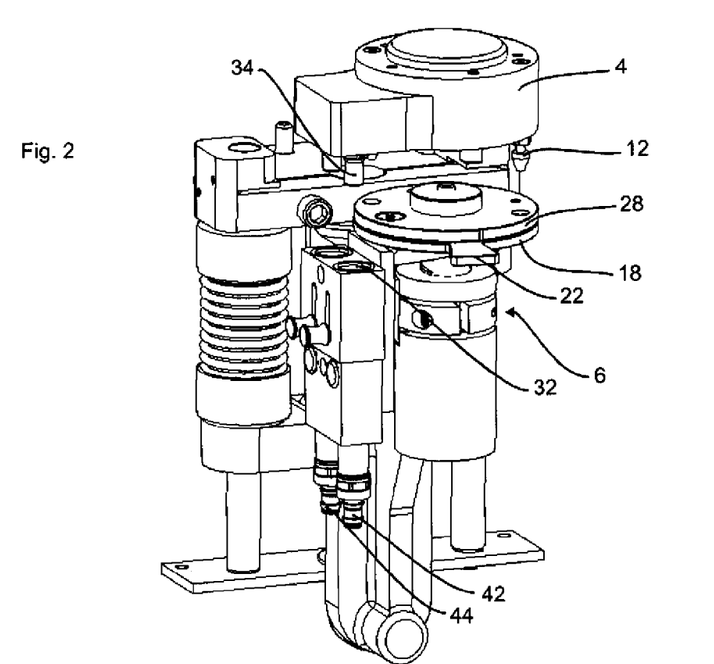
FIG. 2 shows a detailed view of a locking mechanism for a bottom portion.

FIG. 2 shows a first view for illustrating the fastening mechanism. Here, an adapter element 4 is provided on which in turn the bottom portion (not shown) is fastened. Two pin-like bodies 12 are provided on this adapter element, but only one pin-like body 12 is visible. Further, a connection 34 is provided on the adapter element 4, which is used for supplying the coolant line within the adapter element 4 with liquid and in particular water. Adapter element 4 is here at the same time also the first fastening element in terms of the above description. Reference numeral 18 relates to the second fastening element, which is here a locking disc which is rotatably supported on a stationary cylinder pin.

Reference numeral 28 relates to a support body which in a mounted condition is arranged between the adapter element 4 and the second fastening element 18. Reference numeral 22 identifies a lever for rotating the second fastening element 18. Reference numeral 6 identifies the carrier on which the bottom portion is provided in its entirety.

On the carrier, in turn, the carrier body 28 may be mounted in a stationary manner. Reference numeral 32 relates to coupling into which the connections 34 are inserted in a longitudinal direction L of the pin-like body 12.

Figure 3:
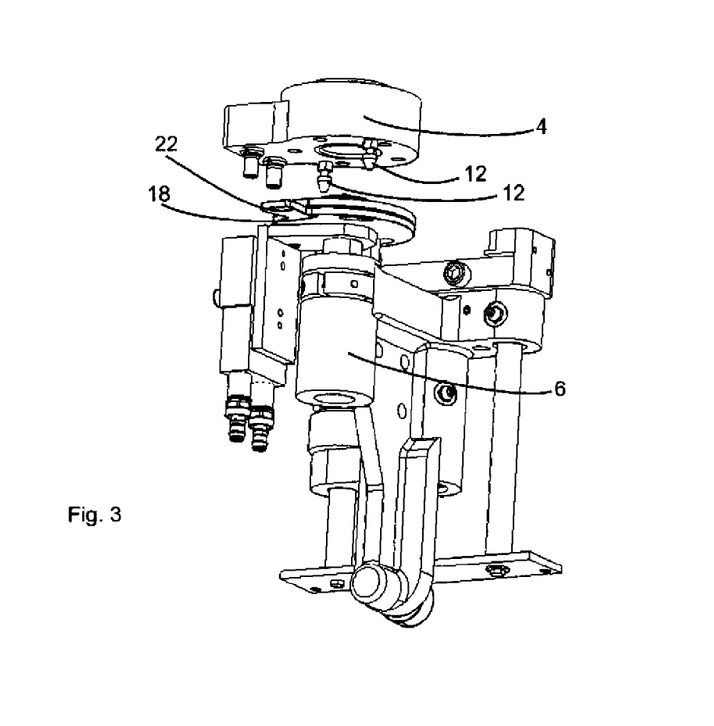
FIG. 3 shows a further view of the illustration shown in FIG. 2.

FIG. 3 shows a further view of the apparatus shown in FIG. 2. What can be seen here is in particular again the second fastening element 18 which is rotatably mounted. Also, in FIG. 3 the two pin-like bodies 12 can be seen which are used for fixing the adapter element relative to the second fastening element 18.

Figure 4:
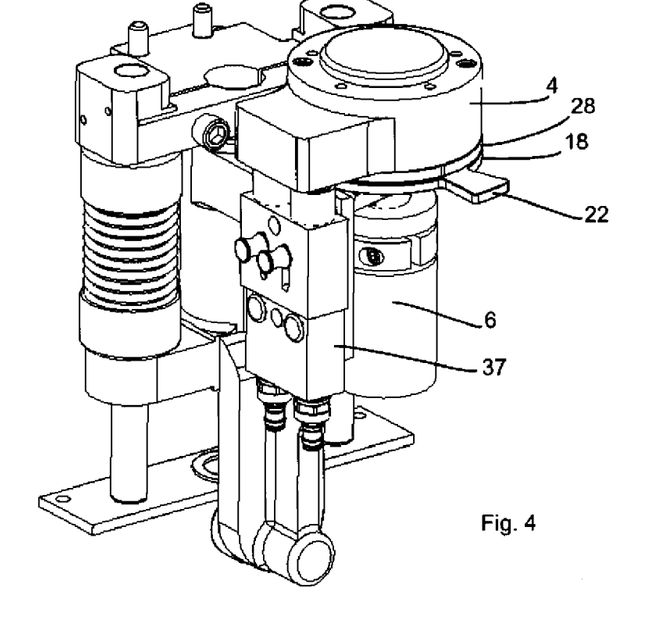
FIG. 4 shows the apparatus from FIG. 1 having a fastened adapter element.

FIG. 4 shows the view from FIGS. 2 and 3, and here the adapter element is locked by means of the second fastening element 18. In this view, also the connections 34 are inserted in a liquid distribution body 37.

Figure 5:
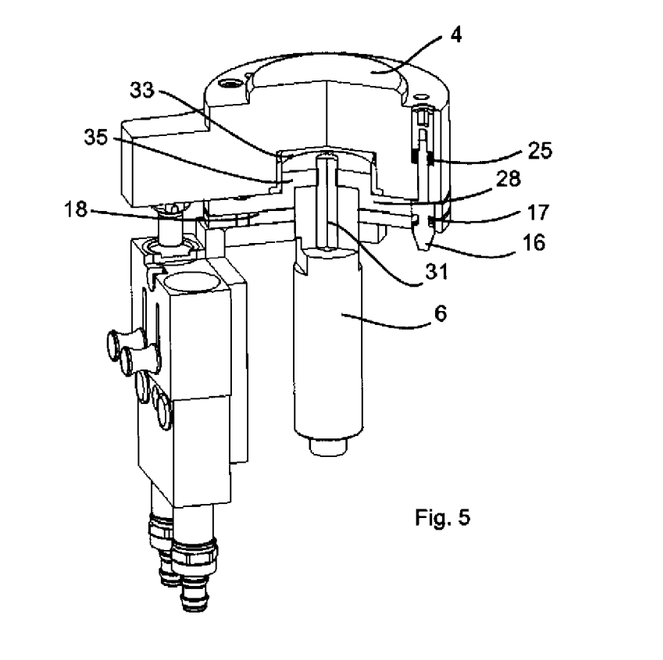
FIG. 5 shows a section through the illustration shown in FIG. 4.

FIG. 5 shows a sectional view of the apparatus shown in FIG. 4. It can be seen that carrier body 28 is mounted here in a rotationally stationary manner on the carrier via a pin or a connection rod 31. This carrier body 28 has a projection 35 which engages on the one hand in a recess 33 of the first fastening element 4 or the adapter element 4 and on the other side also receives a projection or a sleeve 43. Further, the spring elements 25 are provided here, by means of which the pin-like body 12 in FIG. 5 is upwardly tensioned, i.e. in the direction of the adapter element 4. Reference numeral 16 identifies a downwardly tapering terminal section of the pin-like body 12, and reference numeral 17 identifies a circumferential recess which, as will be explained below, is used for engaging into the grooves of the second fastening element 18.

Figure 6:
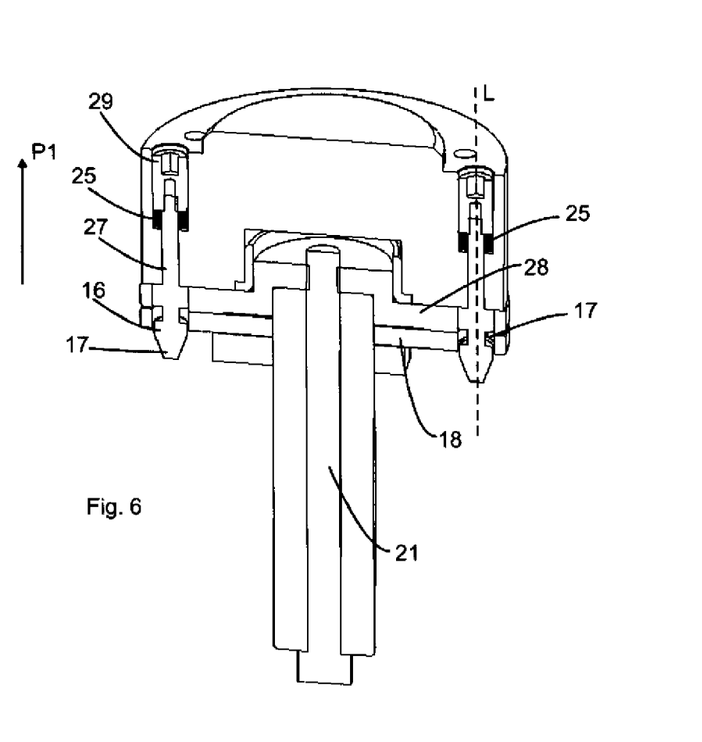
FIG. 6 shows a further sectional view of an apparatus according to the disclosure.

FIG. 6 shows a further sectional view of the apparatus shown in FIG. 5. Here, again, the recess 17 is shown which engages in the corresponding grooves of the second fastening element 18. Reference numeral 29 relates to a head which is here fixedly mounted on a rod element 27 of the pin-like body 12. It is possible here for this head 29 to be rotated relative to the rod element 27, so that in this way the spring force acting on the pin-like body 12 and pushing the same upwards (arrow P1) can be adjusted. A corresponding recess is provided in the adapter element 4, which receives the head 29. Reference numeral 31 in turn identifies the connection rod on which the carrier body 28 is mounted. Reference numeral L identifies here the longitudinal direction of the pin-like body. This extends parallel to the axis Z.

Figure 7:
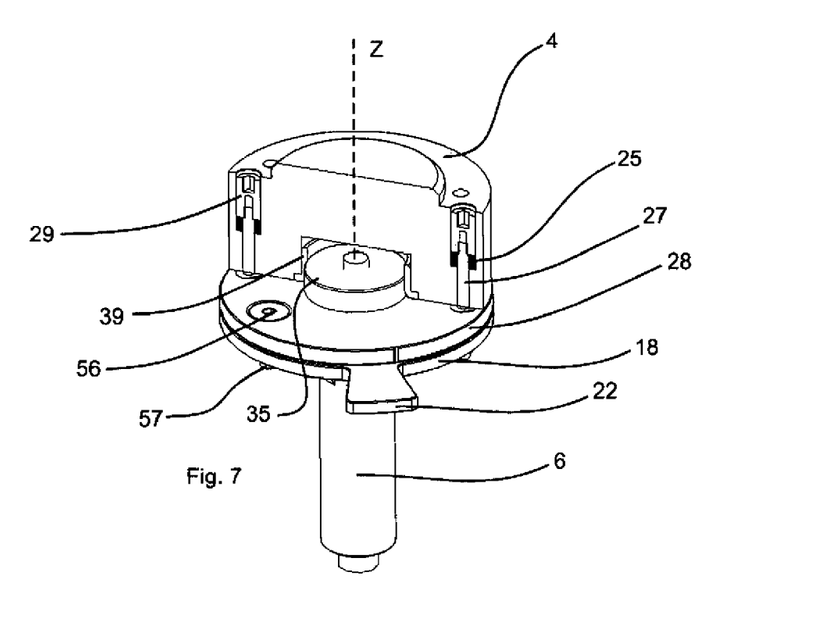
FIG. 7 shows a further partially cut sectional view of an apparatus according to the disclosure.

FIG. 7 shows a further view of the apparatus shown in FIG. 6. Also visible here is a circumferential sleeve 39 which supports the projection 35 relative to the recess 33. Reference numeral Z relates to an axis about which the second fastening element 18 may be rotated. In the direction of this axis, the adapter element 4 may also be placed on the carrier body 28.

Figure 8:
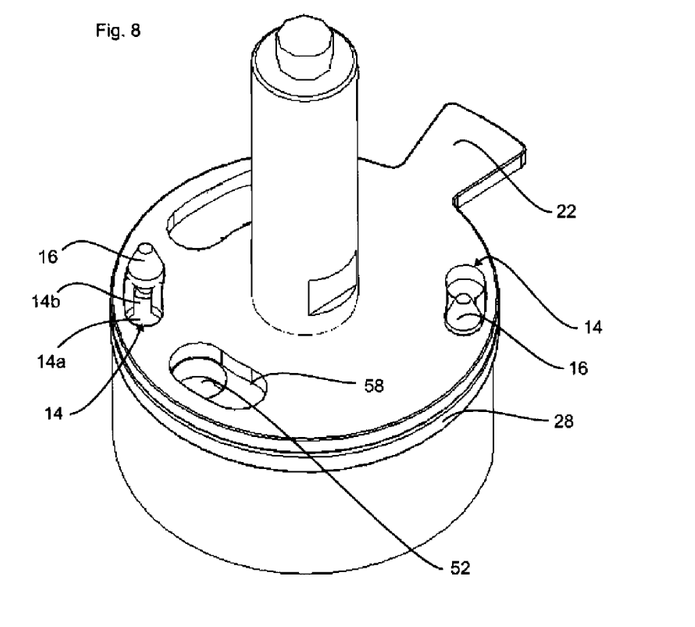
FIG. 8 shows a detailed view of a fastening mechanism according to the disclosure.

FIG. 8 shows a detailed view of the fastening mechanism from the bottom. It can be seen that the second fastening element or the locking disc includes two grooves 14 extending in a circular or circumferential direction. Reference numeral 52 relates to an opening provided in the carrier body 28, which is used for inserting a screw body 57 (cp. FIG. 7).

Figure 9A:
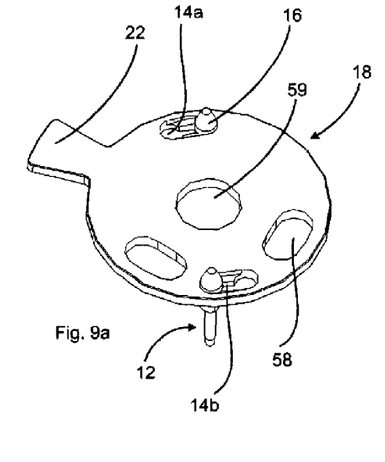
FIGS. 9a, 9b show two views of a second fastening element.
Figure 9B:
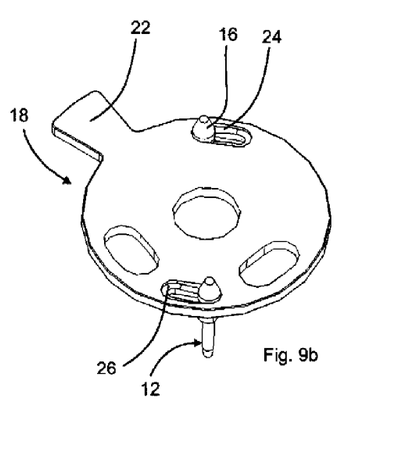

FIGS. 9a and 9b show the second fastening element 18 in two different positions relative to the pin-likes bodies 12. It can be seen again that the second fastening element or the locking disc has the two grooves 14, in which a bevelled surface 24 or an oblique plane are located. Further, the pin-like bodies 12 can be seen which have been pushed through the groove 14. The adapter element shown in the above figures, on which the two pin-like bodies are provided, which are used here as centring or locking pins, is placed on the centring disc or the second fastening element 18.

In this connection, the bottom portion 2 or the adapter element 4 is initially aligned by means of the pin-like body 12, since these pins have to be guided through the bores of the carrier body 28. Thus, carrier body 28 is here also used as the centring element. Further, essentially at the same time, the pin-like bodies or locking and centring pins will be pushed through the locking disc or the second fastening element 18 shown in FIGS. 9a and 9b. In order to clamp the adapter element 4, as mentioned above, the second fastening element 18 is rotated about a certain angle in the clockwise direction. Here, by means of the oblique plane 24, the pin-like bodies are further pre-stressed and the adapter element 4, on which a bottom portion (not shown) may then be located, will be sufficiently fixed and clamped.

The final position of the second fastening element or the locking disc will be signalled or maintained via a latching arrangement 26. The lock is opened by turning the second fastening element 18 in the opposite direction. Here, too, the second fastening element is retained in the open position by means of a latching arrangement (not shown). The opening 58 in the further fastening element is used for inserting the screw element 57 or the head 56 thereof. Also the opening allows here the rotation of the further fastening element about a defined angle. By means of the screw elements 57, the carrier body 28 is screwed on in a predefined position.

Figure 10A:
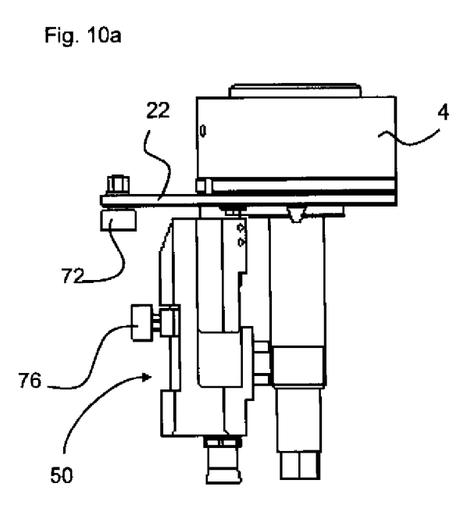
FIGS. 10a-10c show three views for illustrating the automated (de-)coupling of the media supply and the locking and unlocking, respectively, of the bottom mould.
Figure 10B:
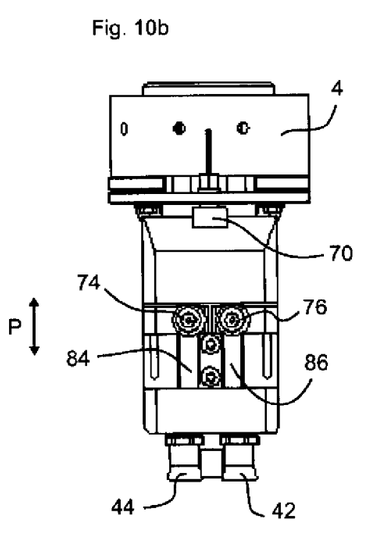
Figure 10C:
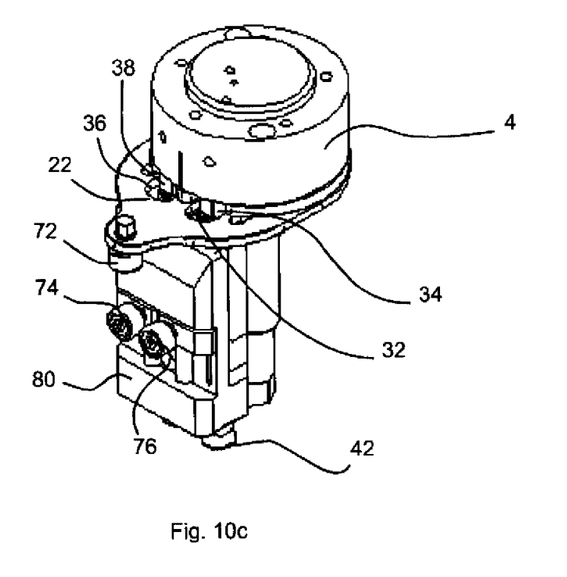

FIGS. 10a to 10c show a further embodiment of the apparatus according to the disclosure. Here, in particular, the automated release and/or locking of the bottom mould and also the automated coupling and decoupling of the media supply, i.e. for the tempering medium, are shown. Reference numeral 72 identifies a cam roller which is provided on the lever 22, in order to achieve an automatic release of the first fastening element by means of a guiding curve. Reference numeral 50 identifies in its entirety a coupling unit for coupling and decoupling media, in particular tempering media. To this end, two cam rollers 74 and 76 are provided which are slidable within the grooves 84 and 86 in the direction P. This direction P is here parallel to a longitudinal direction of the respective blow moulds or also to a longitudinal direction of the respective containers. However, also a movement of the cam rollers 74 and 76 in a direction extending vertical thereto or also in other directions would be conceivable.

Reference numeral 34 in FIG. 10c identifies a connection for supplying a tempering medium and reference numeral 38 identifies a corresponding discharge connection in order to discharge the tempering medium again. This supply connection 34 cooperates with a supply element 32 which is designed to be movable, and the discharge connection 38 correspondingly cooperates with a discharge element 36. By means of a movement of the two cam rollers 74 and 76, also the supply element 32 and the discharge element 36 are moved in the direction of the double arrow P. Reference numeral 80 identifies a carrier on which the two cam rollers 74 are movably supported. Reference numerals 42 and 44 as shown in FIG. 10b relate to main connections, in order to connect for example tubes for a tempering medium.

Figure 11A:
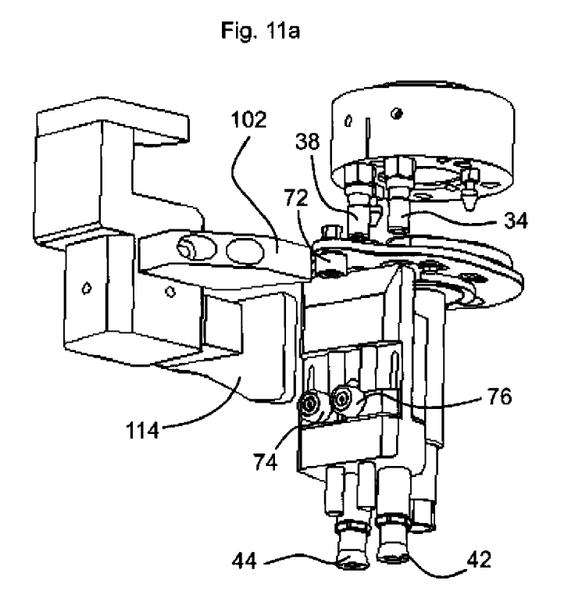
FIGS. 11a, 11b show further views for illustrating the automated (de-)coupling of the media supply as well as the locking and unlocking, respectively, of the bottom mould.

FIG. 11a shows a view of an apparatus according to the disclosure. Here, the lever 22 or the locking disc has to be moved via a guiding curve 102 into the released position, in order to unlock the bottom mould 4. Via a further guiding curve, a corresponding locking of the bottom mould or the adapter element 4 may be achieved. These individual guiding curves are here disposed in a stationary manner relative to a movement path of the individual blow moulding stations.

Figure 11B:
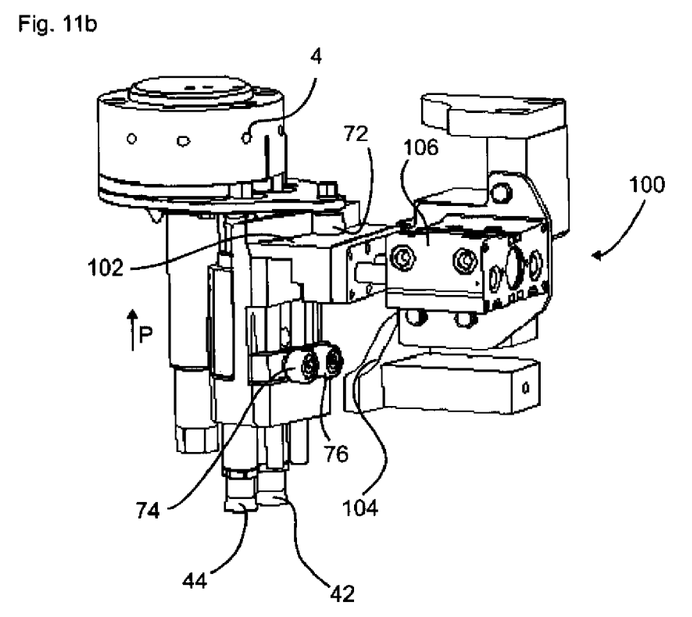

Preferably, the media connections are subsequently decoupled via a unit and a curve 114. To this end, the two cam rollers 74 and 76 are moved downwards and in this way the supply and discharge connections (34, 38) are decoupled from the supply and discharge elements (not shown). FIG. 11b shows the corresponding coupling operation. To this end, a further guiding curve 104 is provided, along which the cam rollers 74 and 76 slide and are pushed upwards in this way back in the direction of the arrow P. The guiding curve is thus used for connecting the supply and discharge connections with the supply and discharge elements.

Guiding curve 104 and preferably also the guiding curve 114 and the guiding curve 102 may here preferably be fed in, and drive means may respectively be provided in order to feed the guiding curves 102, 104 and 114 specifically for a mounting operation, in order to enable in this way a separation or connection of the media supply and discharge as well as an unlocking and/or locking of the bottom mould 4.

Reference numeral 106 identifies a valve unit in order to feed in the guiding curve 102, in order to enable in this way the bottom portion to be locked. In the embodiment shown in FIG. 11b, again, initially the bottom portion is locked and subsequently also the media connections 32, 34 or 36, 38 are connected via the curve 104. Reference numeral 100 identifies in its entirety the feed-in mechanism for the individual guiding curves.

It will be apparent to those skilled in the art that various modifications and variations can be made to the rapid changeover mechanism for bottom portions of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. An apparatus for moulding plastic preforms into plastic containers comprising at least one blow moulding station having a cavity, within which the plastic preforms may be expanded into plastic containers, the blow moulding station including a bottom portion which delimits the cavity, the bottom portion being detachably disposed on a carrier by a fastening mechanism, the fastening mechanism having at least one pin-like body disposed on a first fastening element, said pin-like body engaging in a groove provided in a second fastening element when in a condition in which the bottom portion is fastened to the carrier, the pin-like body being displaceable relative to the carrier in the groove for fastening the bottom portion and with the groove being designed in such a way that an end section of the pin-like body is permitted to pass through the groove in a first region of the groove and not permitted to pass through the groove in a second region of the groove.

2. The apparatus as claimed in claim 1, wherein the pin-like body has at least one groove on its external circumference.

3. The apparatus as claimed in claim 1, wherein the bottom portion is disposed on an adapter element, and the adapter element is disposed on the carrier via the fastening mechanism.

4. The apparatus as claimed in claim 1, wherein the at least one pin-like body is in connection with the bottom portion.

5. The apparatus as claimed in claim 1, wherein the fastening element is rotationally mounted relative to the bottom portion.

6. The apparatus as claimed in claim 1, wherein at least one spring element for pre-stressing the pin-like body relative to the first fastening element is provided.

7. The apparatus as claimed in claim 1, wherein in at least one groove, an inclined guiding surface is provided which causes the pin-like body to be moved in its longitudinal direction in the case of a relative movement of the pin-like body relative to the groove.

8. The apparatus as claimed in claim 1, wherein in at least one groove, a latching surface is provided, in which a section of the pin-like body latches in a predefined relative position between the groove and the pin-like body.

9. The apparatus as claimed in claim 1, wherein the first fastening element is provided to be rotational about a predefined rotational axis.

10. The apparatus as claimed in claim 1, wherein a carrier body is provided between the first fastening element and the second fastening element in a mounted condition of the bottom portion.

11. The apparatus as claimed in claim 1, wherein the apparatus has at least two pin-like bodies which are spaced from one another.

12. The apparatus as claimed in claim 1, wherein the apparatus has a supply connection for supplying a flowable tempering medium and a discharge connection for discharging the flowable tempering medium, as well as a supply element, in order to supply the flowable medium to the supply connection and a discharge element for discharging the tempering medium out of the discharge connection, wherein at least the supply element may be automatically separated from the supply connection or the discharge element may be automatically separated from the discharge connection.

13. The apparatus as claimed in claim 12, wherein the apparatus has at least one guiding curve, in order to lock or unlock the first fastening element.

14. The apparatus as claimed in claim 12, wherein the apparatus has a guiding curve for separating the supply element from the supply connection and/or for separating the discharge element from the discharge connection.

15. A mounting assembly for mounting a bottom portion for an apparatus for moulding plastic preforms into plastic containers on a carrier, wherein the bottom portion is detachably mounted on a carrier by means of a fastening mechanism, wherein the fastening mechanism has at least one pin-like body provided on a first fastening element, which pin-like body engages in a condition in which the bottom portion is fastened to the carrier in a groove provided in a second fastening element, wherein the pin-like body is displaceable in the groove for fastening the bottom portion relative to the carrier and the groove is designed in such a way that an end section of the pin-like body may pass through the groove in a first region of the groove and cannot pass through the groove in a second region of the groove.

* * * * *